United States Patent
Cowsik (10) Patent No.: US 9,110,181 B2
(45) Date of Patent: Aug. 18, 2015

(54) ROTATIONAL SEISMOMETER FOR NEAR-FIELD MEASUREMENTS

(75) Inventor: Ramanath Cowsik, St. Louis, MO (US)

(73) Assignee: Washington University, St. Louis, MO (US)

(*) Notice: Subject to any disclaimer, the term of this patent is extended or adjusted under 35 U.S.C. 154(b) by 798 days.

(21) Appl. No.: 13/051,298

(22) Filed: Mar. 18, 2011

(65) Prior Publication Data

US 2011/0231100 A1 Sep. 22, 2011

Related U.S. Application Data

(60) Provisional application No. 61/315,631, filed on Mar. 19, 2010.

(51) Int. Cl.
*G01V 1/00* (2006.01)
*G06F 3/00* (2006.01)
*G06F 3/01* (2006.01)
*G06F 3/033* (2013.01)

(52) U.S. Cl.
CPC .................................... *G01V 1/008* (2013.01)

(58) Field of Classification Search
CPC ................................ G01V 1/00; G01V 13/00
USPC ......... 702/5, 9, 10, 11, 12, 14, 179, 182, 186, 702/188; 73/653; 367/182; 374/161; 356/460
See application file for complete search history.

(56) References Cited

U.S. PATENT DOCUMENTS

| 1,843,342 | A | | 2/1932 | Shaw et al. | |
|---|---|---|---|---|---|
| 2,637,839 | A | | 5/1953 | Piety | |
| 4,152,692 | A | * | 5/1979 | McNeel | 367/182 |
| 4,567,771 | A | * | 2/1986 | Nelson et al. | 73/653 |
| 4,848,157 | A | * | 7/1989 | Kobayashi | 73/514.33 |
| 5,001,682 | A | * | 3/1991 | Anderson | 367/186 |
| 5,525,809 | A | * | 6/1996 | Bolea | 250/559.27 |
| 5,771,170 | A | * | 6/1998 | Withers et al. | 702/16 |
| 5,847,694 | A | * | 12/1998 | Redford et al. | 345/158 |
| 5,871,391 | A | * | 2/1999 | Pryor | 451/9 |
| 7,222,534 | B2 | * | 5/2007 | Maas et al. | 73/514.26 |
| 7,243,543 | B2 | * | 7/2007 | Berg et al. | 73/514.26 |
| 7,401,514 | B2 | | 7/2008 | Wang et al. | |
| 8,277,119 | B2 | * | 10/2012 | Cloutier et al. | 374/161 |
| 2010/0231919 | A1 | * | 9/2010 | Schreiber et al. | 356/460 |

OTHER PUBLICATIONS

R. Cowsik, Performance Characteristics of a Rotational Seismometer for Near-field and Engineering Applications, McDonnell Center for the Space Sciences & Physics Department, Washington University, St. Louis, MO, dated Jun. 17, 2008 (7 pages).

R. Cowsik, An Instrument for Direct Observations of Seismic and Normal-Mode Rotational Oscillations of the Earth, McDonnell Center for the Space Sciences & Physics Department, Washington University, St. Louis, MO, dated Feb. 14, 2007 (6 pages).

* cited by examiner

*Primary Examiner* — Eliseo Ramos Feliciano
*Assistant Examiner* — Felix Suarez
(74) *Attorney, Agent, or Firm* — Polsinelli PC (57) ABSTRACT

A rotational seismometer having a housing that encases an optical lever having a light source for emitting a beam of light through a slit defined by the optical lever that is focused by a lens for focusing the beam of light to a balance bob suspended within the housing is disclosed. The balance bob includes a mirror secured to a plate attached to the housing through an arrangement that includes a thin fiber attached to a stiff wire such that the stiff wire bends and the thin wire does not bend when a tilt motion is applied to the rotational seismometer.

20 Claims, 11 Drawing Sheets

| Earthquake event date | Location of source Signals | Magnitude | Location of Sensors |
|---|---|---|---|
| September 2, 2009 | Java, Indonesia | 7.0 | Pier |
| September 21, 2009 | Bhutan | 6.1 | Observatory |
| September 29, 2009 | Samoa Islands Region | 8.0 | Bunker |
| September 30, 2009 | Southern Sumatra, Indonesia | 7.6 | Bunker |
| October 07, 2009 | Vanuatu | 7.6 | Bunker |
| October 23, 2009 | Banda Sea | 6.9 | Pier |

FIG. 12

# ROTATIONAL SEISMOMETER FOR NEAR-FIELD MEASUREMENTS

CROSS-REFERENCE TO RELATED APPLICATION

This application claims priority from U.S. provisional patent application Ser. No. 61/315,631 filed on Mar. 19, 2010 and is herein incorporated by reference it its entirety.

FIELD

The present document relates to a method and system for detecting and recording the rotations associated with seismic activity related to earthquakes, and in particular to a rotational seismometer for performing near-field measurements of earthquakes.

BACKGROUND

Rotational seismology is an emerging area for studying all aspects of rotational ground motions induced by earthquakes, explosions and ambient vibrations. This particular field of seismic study has found application to a wide range of geophysical disciplines, including strong-motion seismology, broadband seismology, earthquake engineering and physics, seismic instrumentation, seismic hazards, seismotectonics, and geodesy. Although translational ground motions have been traditionally detected and observed in seismology, scientists have found that measuring the three components of rotational motion and the six or more components of strain will improve our understanding of the earthquake process and the complex ground motions generated by such seismic activity.

In seismology, the general motion of particles or a small volume in a solid body can be divided into three parts: translation (along the x, y, and z axes), rotation (about the x, y, and z axes), and strain. Because it has been found that the recurrence interval of a large earthquake at a given fault line has been approximately between 100 to 10,000 years, seismologists have been trying to optimize their observations for either studying either large earthquakes at great distances or smaller local earthquakes at closer distances. As such, traditional seismographs have been designed to have a high sensitivity at the expense of being able to record large motions on scale.

Until recently, observational seismology has been based mainly on measuring translational motions since rotational motions imparted by seismic activity have been considered insignificant to the seismological observations of earthquakes. Although translational motions induced by seismic activity along the three axes have been observed extensively, yielding essentially all the information we currently know about earthquakes and the structure of the Earth, the rotation about these axes has proven to be very difficult to detect and record due to the lack of suitable instruments. However, during the past few years the pioneering efforts of scientists observing the Sagnac effect caused by rotations on ring laser gyroscopes have started to yield important new results in seismology related to observing rotational motions imparted by seismic activity. Unfortunately, a notable disadvantage of such laser gyroscopes is their prohibitive cost, requirement for sophisticated facilities, and complicated operation.

Accordingly, there is a need for a rotational seismometer that detects and records rotational motions associated with seismic activity in near-field earthquakes that is relatively simple to operate, robust in construction, and affordable with sensitivities to seismic activity that meet the standards set forth by the International Working Group on Rotational Seismology.

SUMMARY

In one embodiment, a rotational seismometer includes a housing defining a chamber with an optical lever disposed in the chamber. The optical lever includes a light source for emitting a beam of light and a slit in communication with the light source for emitting the beam of light through the slit. In addition, the optical lever includes a position sensing diode for detecting an image generated by the beam of light after reflection. The housing also encases a field lens having a lens for focusing the beam of light generated by the light source. A balance bob is suspended inside the chamber for reflecting the beam of light focused by the field lens. The balance bob includes a plate having a mirror that reflects the beam of light. A thin fiber is attached to the plate and a stiff wire is secured to the thin fiber for suspending the balance bob with the mirror reflecting the beam of light to generate a reflected beam of light back through the lens for detecting of the image generated by the reflected beam of light by the position sensing diode, wherein the balance bob being suspended by the thin fiber and the stiff wire permits detection of rotational motions related to a seismic activity while preventing detection of torsion motions related to the seismic activity.

In another embodiment, a system for detecting rotational motions related to seismic activity includes a housing defining a chamber with an optical lever disposed in the chamber. The optical lever includes a light source for emitting a beam of light and a slit in communication with the light source for emitting the beam of light through the slit. In addition, the optical lever includes a position sensing diode for detecting an image generated by the beam of light after reflection. The housing also encases a field lens having a lens for focusing the beam of light generated by the light source. A balance bob is suspended inside the chamber for reflecting the parallel beam of light focused by the field lens. The balance bob includes a plate having a mirror that reflects the beam of light. A thin fiber is attached to the plate and a stiff wire is secured to the thin fiber for suspending the balance bob inside the housing with the mirror reflecting the parallel beam of light to generate a reflected beam of light back through the lens for detection of the image by the position sensing diode, wherein the balance bob being suspended by the thin fiber and the stiff wire permits detection of rotational motions related to a seismic activity while preventing detection of torsion motions related to the seismic activity. The system also includes a processor for processing data received from the position sensing diode and an output device for displaying the data processed by the processor.

In yet another embodiment, a method for detecting rotational motions includes providing a rotational seismometer having a housing defining a chamber with an optical lever disposed in the chamber. The optical lever includes a light source for emitting a beam of light and a slit in communication with the light source for emitting the beam of light through the slit. In addition, the optical lever includes a position sensing diode for detecting an image generated by the beam of light after reflection. The housing also encases a field lens having a lens for focusing the beam of light generated by the light source. A balance bob is suspended inside the chamber for reflecting the beam of light focused by the field lens. The balance bob includes a plate having a mirror that reflects the beam of light. A thin fiber is attached to the plate and a stiff wire is secured to the thin fiber for suspending the balance bob with the mirror reflecting the beam of light to generate a reflected beam light back through the lens for detection of the image generated by the reflected beam of light by the position sensing diode, wherein the stiff wire bends and the thin fiber does not bend when a tilt motion is applied to the housing. The method further includes detecting rotational motions related to seismic activity by the rotational seismometer and recording the rotational motions detected by the rotational seismometer.

Additional objectives, advantages and novel features will be set forth in the description which follows or will become apparent to those skilled in the art upon examination of the drawings and detailed description which follows.

Corresponding reference characters indicate corresponding elements among the view of the drawings. The headings used in the figures should not be interpreted to limit the scope of the claims.

DETAILED DESCRIPTION

Figure 1:
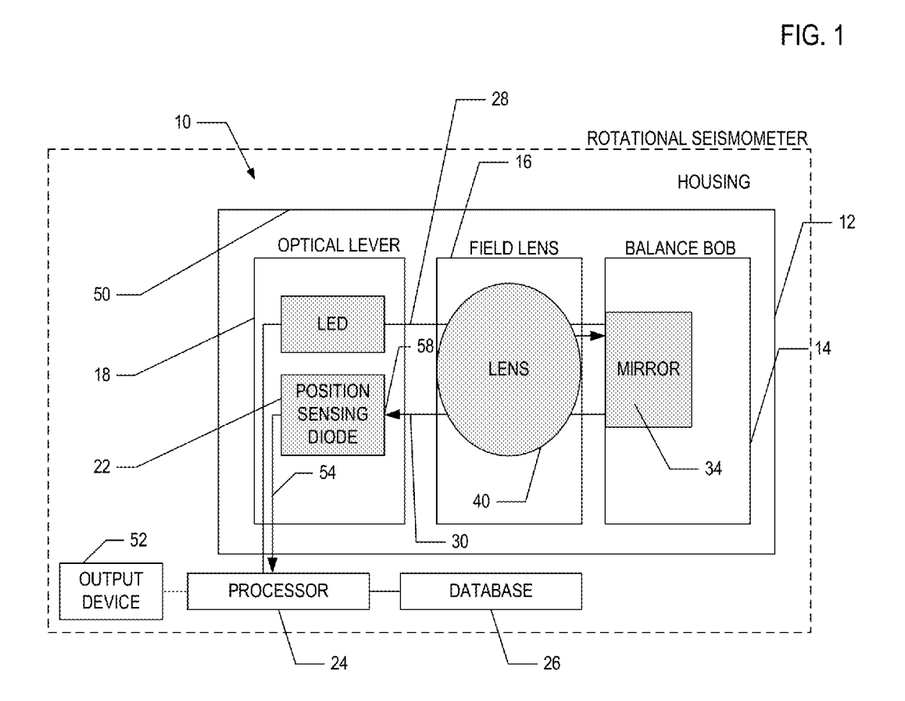
FIG. 1 is a simplified block diagram of a rotational seismometer.
Figure 2:
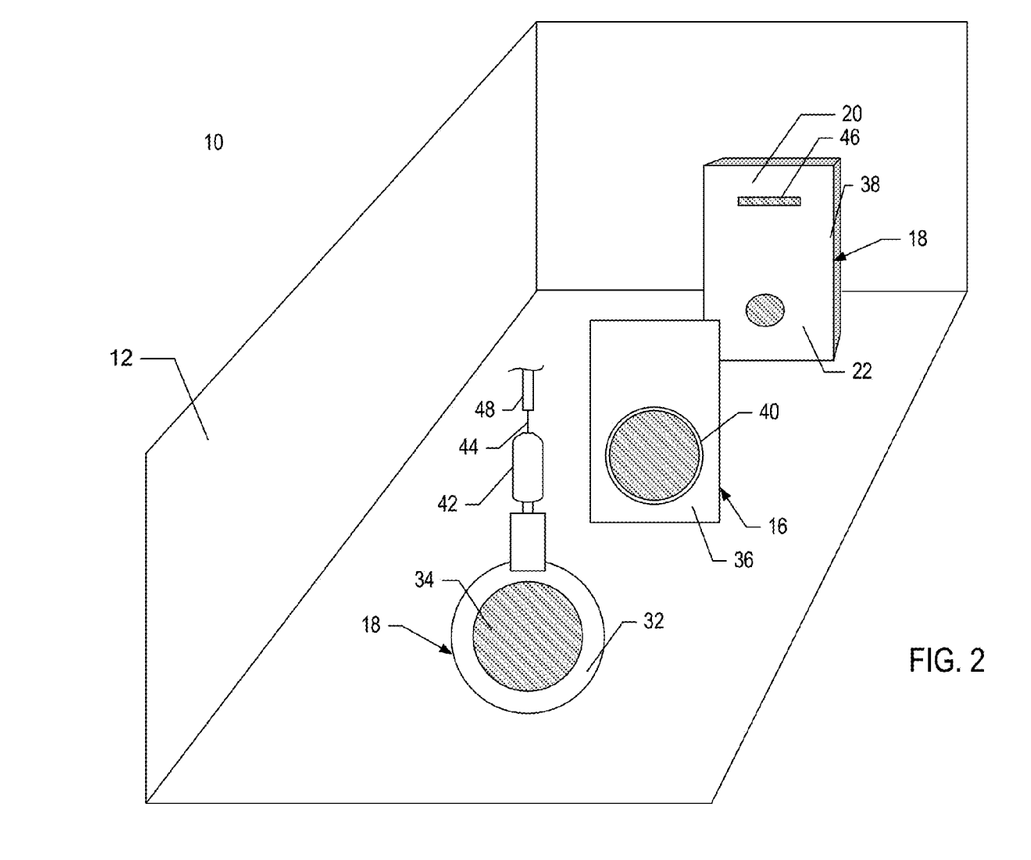
FIG. 2 is a partial cross-sectional perspective view of an embodiment of the rotational seismometer.

Referring to the drawings, an embodiment of a rotational seismometer is illustrated and generally indicated as 10 in FIGS. 1-11. As shown in FIGS. 1 and 2, one embodiment of the rotational seismometer 10 includes a housing 12 that encases the various components of the seismometer 10 for detecting and recording the rotational motions associated with seismic activity generated by near-field earthquakes. The housing 12 provides an airtight container, which is insulated thermally to avoid convection currents and is shielded from variations of the magnetic fields by a μ-metal sheath. The rotational seismometer 10 includes an optical lever 18 encased inside the housing 12 for generating a beam of light 28 for transmission through a field lens 16 that focuses the beam of light 28. The field lens 16 is interposed between the optical lever 18 and a balance bob 14 suspended inside the housing 12. In one arrangement of the rotational seismometer 10, the beam of light 28 is focused through the field lens 16 after transmission by the optical lever 18. The focused beam of light 28 is then reflected off the balance bob 14 such that a reflected beam of light 30 is again focused through the field lens 16. The optical lever 18 then detects the reflected beam of light 30 focused through the field lens 16. In one embodiment, the optical lever 18 includes a position sensing diode 22 that detects the presence and position of an image 58 generated by the reflected beam of light 30.

In one embodiment, the rotational seismometer 10 includes a processor 24 that receives a signal 54 generated by the position sensing diode 22 after the reflected beam of light 30 is detected by the optical lever 18. The processor 22 then processes the data, such as the position of the reflected beam of light 30 along the position sensing diode 22 embedded in the signal 54 and transmits the data for storage to a database 26. The processor 24 may also transmit the data to an output device 52, such as a seismograph or other suitable output device, for processing and/or illustrating the data output of the position sensing diode 22.

Figure 3:
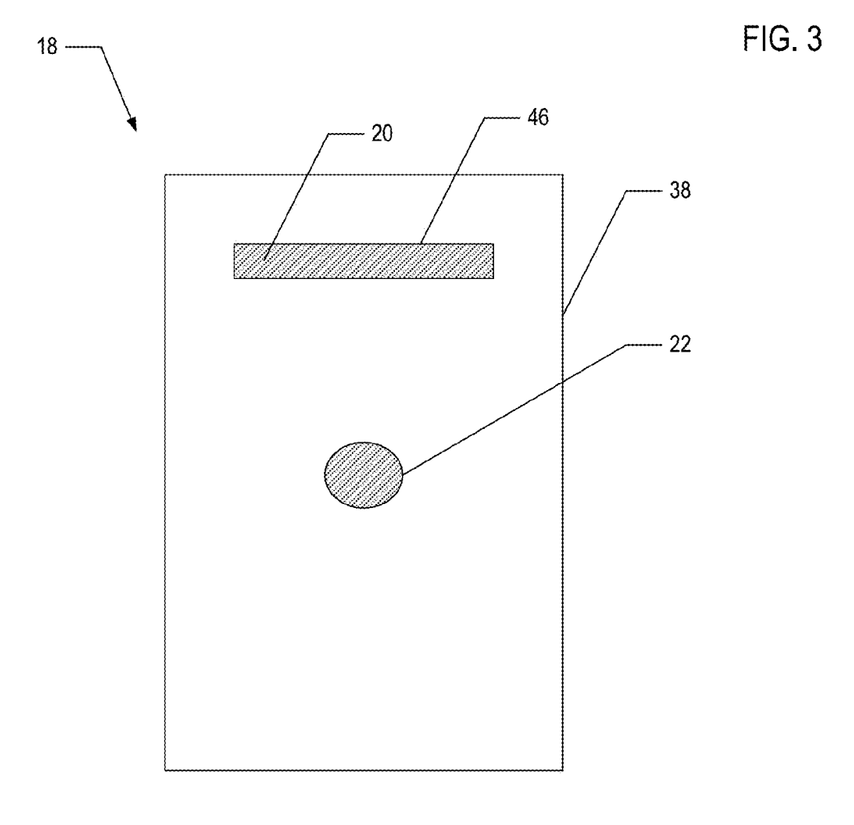
FIG. 3 is a front view of an optical lever for the rotational seismometer shown in FIG. 2.

As shown in FIGS. 2 and 3, the optical lever 18 has an optical lever body 38 defining a single illuminated slit 46 that provides an auto-collimating function for focusing the beam of light 28 along an optical pathway as shall be discussed in greater detail below. In one embodiment, the optical lever 18 includes a Light Emitting Diode (LED) 20 for generating the beam of light 28. In operation, the slit 46 focuses the beam of light 28 generated by the LED 20 such that the beam 28 is transmitted through and focused by the field lens 16 in order for the beam 28 to be reflected off the balance bob 14. A reflected beam of light 30 from the balance bob 14 is then transmitted back through the field lens 16 to the optical lever 18. The position sensing diode 22 detects the image 58 generated by the reflected beam of light 30 after the reflected beam of light 30 has been transmitted through the field lens 16.

Figure 4:
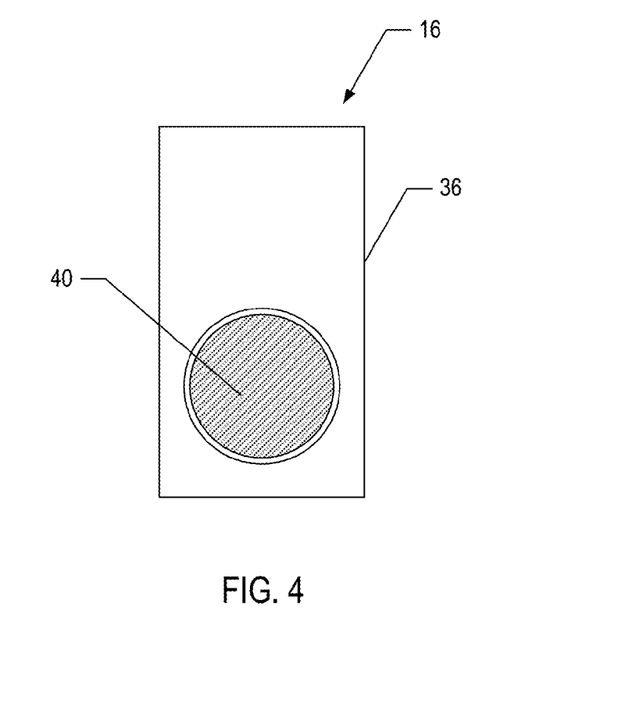
FIG. 4 is a front view of a field lens for the rotational seismometer shown in FIG. 2.

Referring to FIG. 4, the field lens 16 includes a field lens body 36 having a lens 40 positioned along the body 36 that initially focuses the beam of light 28 to reflect off the balance bob 14 and then back through the lens 40 so that the image 58 of the reflected beam of light 30 is received by the position sensing diode 22. In one embodiment, the lens 40 may be a 200 mm focal length lens that provides an autocollimator function to the rotational seismometer 10.

Figure 5:
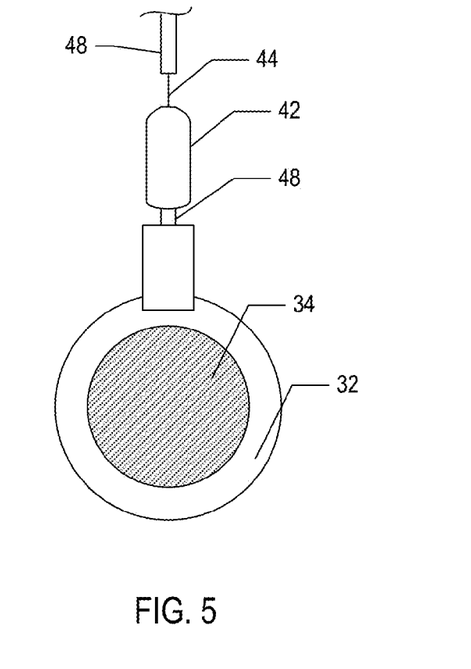
FIG. 5 is a front view of a balance bob for the rotational seismometer shown in FIG. 3.

Referring to FIGS. 1, 2 and 5, one embodiment of the balance bob 14 includes a circular plate 32 for retaining a mirror 34 that functions to reflect the beam of light 28 to produce the reflected beam of light 30. The circular plate 32 is attached to a thin fiber 44 and a stiff wire 48 for suspending the balance bob 14 from a ceiling 50 of the housing 12. This arrangement of the thin fiber 44 connected to the stiff wire 48 permits any twist that may occur in the thin fiber 44 to result in a counter torque being generated that leads to back and forth oscillations of the balance bob 14. These torsional motions occur about the suspended thin fiber 44, which lie in the direction of gravity. As such, gravity does not affect the balance bob 14 of the rotational seismometer 10 in any way with the exception that the force of gravity will impart a weight to the balance bob 14. This weight in turn applies a tension to the thin fiber 44 that suspends the balance bob 14. In this arrangement, small seismic oscillations will apply a torque to the balance bob 14 whose response is in near unity for frequencies below the natural frequency of the balance bob 14. On the other hand, the response of the balance bob 14 rapidly decreases at higher frequencies. Accordingly, the balance bob 14, which moves with the seismic oscillations, presents a stationary target to be viewed by the optical lever 18, thereby accurately detecting and recording such seismic oscillations associated with rotational motions related to seismic activity in the near field of earthquakes.

The balance bob 18 is designed to have a natural frequency of oscillation below that of the lowest frequencies to be measured by the rotational seismometer 10; namely, frequencies related to rotational motion associated with seismic activity in near-field earthquakes. Suspending the balance bob 14 using the thin fiber 44 makes the balance bob 14 insensitive to ground tilts. In one embodiment, the circular plate 32 may be made from aluminum, while the mirror 34 may have a diameter of 40 mm. In addition, the moment of inertia of the balance bob 14 can be easily adjusted by modifying the diameter of the circular plate 32 holding the mirror 34.

As further shown, the balance bob 14 may be suspended from a rectangular cross-section 42 to reduce the restoring torque. However, such an arrangement of the thin fiber 44 and the rectangular cross-section 48 can generate finite couplings between the torsion and tilt modes of the balance bob 14. To mitigate this effect, the balance bob 14 in one embodiment includes the stiff wire 48 attached to the end of the fiber 44 to suspend the balance bob 14 from the ceiling 50. The stiff wire 48 is adapted to bend following tilt motions being applied to the housing 12 of the rotational seismometer 10, but not torsion motions. This arrangement prevents the thin fiber 44 attached to the stiff wire 48 from bending, thereby allowing the balance bob 14 to be isolated from tilt motions. In one embodiment, the stiff wire 48 may be manufactured from an SS-304 alloy with dimensions of 7 µm×110 µm and a length of 3.5 cm.

Figure 6:
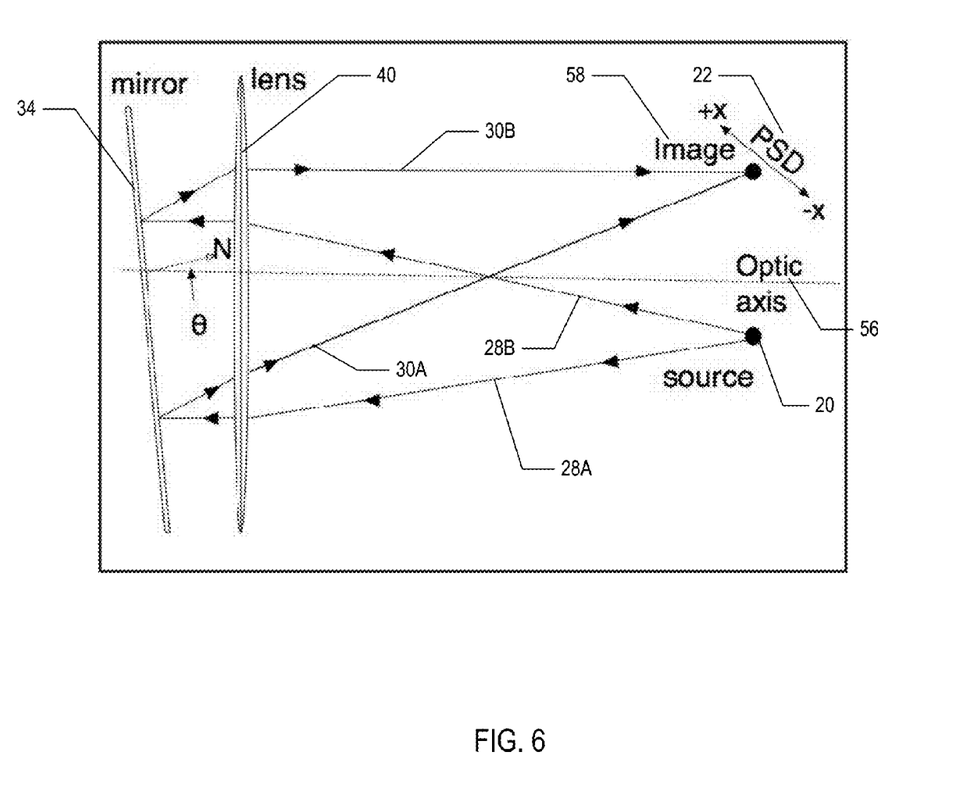
FIG. 6 is a schematic diagram illustrating the optical pathway of the beam of light and reflected beam of light relative to the optical lever, field lens, and balance bob of the rotational seismometer.

Referring to FIG. 6, a schematic diagram of the rotational seismometer 10 is shown to illustrate the optical pathways of the beam of light 28 from the optical lever 18 through the field lens 16 to the balance bob 14. The diagram also illustrates the pathways of the reflected beam of light 30 produced by the reflection of the beam of light 28 off the balance bob 14 and back to the optical lever 18 through the field lens 16. The LED 20 of the optical lever 18 transmits the beam of light 28 comprising a beam 82A that travels below an optical axis 56 and a beam 28B that travels above the optical axis 56. This arrangement ensures that the quality of the image 58 for the reflected beam of light 30 detected by the position sensing diode 22 and the angular displacement of the image 58 of the reflected beam of light 30 due to motions in the mirror 34 of the balance bob 18 are independent of the changes in ambient temperature outside of the housing 12.

In one embodiment, the slit 46 of the optical lever 18 is illuminated by a high intensity LED 20 having a luminosity of 100,000 mcd that emits a forward cone of a high intensity beam of light 28 at an angle of 7 degrees relative to the optical axis 56. The beam of light 28 is transmitted by the LED 20 at the focal plane of the lens 40 having an aperture of f=200 mm. In this arrangement, the position sensing diode 22 is capable of detecting the image 58 of the reflected beam 30 having a maximum frequency of 100 Hz.

EXAMPLES

To assess the feasibility of the rotational seismometer 10, the same rotational seismometer 10 was individually located at three different locations under various noise conditions. One rotational seismometer 10 at location A was set up on a seismic pier in a basement laboratory that was decoupled from the building and tied to the bedrock 30 feet below; however, location A was not completely isolated from anthropological noise and was never completely quiet. Another rotational seismometer 10 was located at location B at a research facility 25 miles outside St. Louis, Mo. Location B provided a culturally quite environment, although the building was not fully insulated from noise originating from ambient temperature variations. Finally, the rotational seismometer 10 at location C was located in an old ammunition bunker, which provided the best conditions in terms of quietness and negligible ambient temperature variations.

Figure 7A:
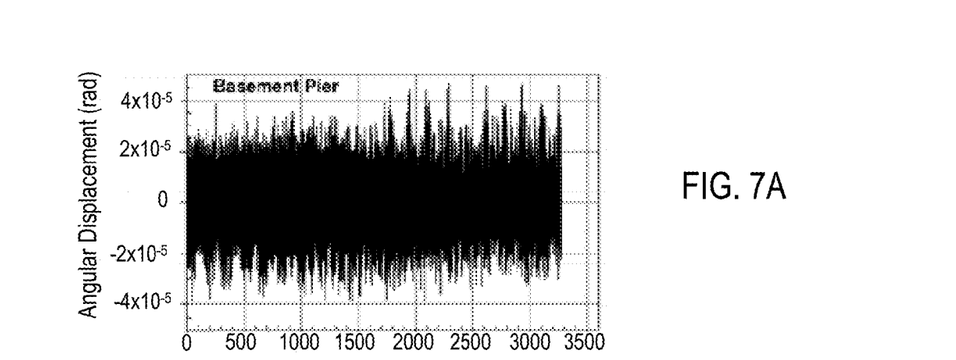
FIGS. 7A, 7B and 7C are graphs illustrating the angular deflection of the balance bob over time for three different embodiments of the rotational seismometer at separate locations.
Figure 7B:
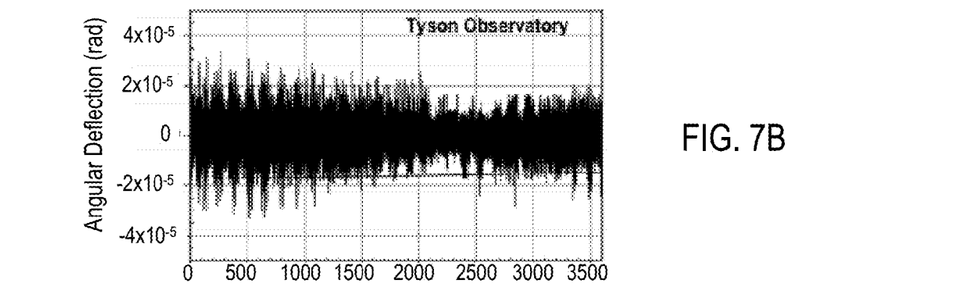
Figure 7C:
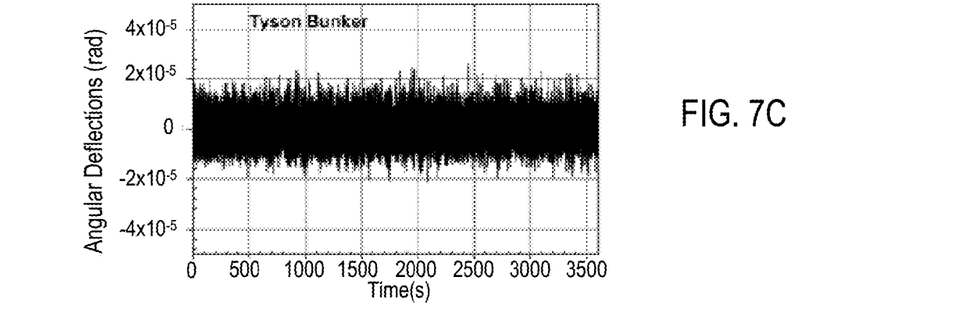
Figure 8A:
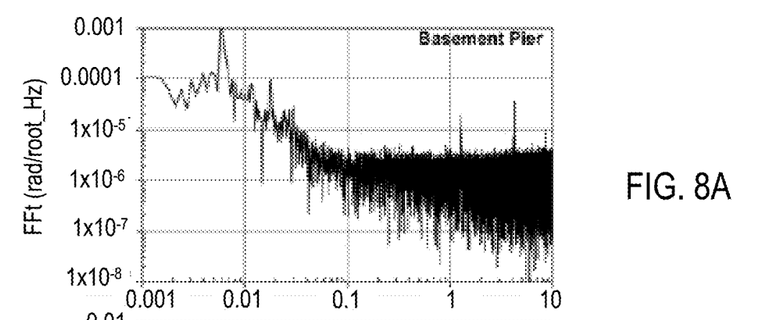
FIGS. 8A, 8B and 8C are corresponding graphs to FIGS. 7A, 7B and 7C illustrating the Fast Fourier Transform (FFT) spectrum for the three different embodiments of the rotational seismometer.

FIG. 7A illustrates the angular positions of the balance bob 14 at location A after removing the long term drifts, while FIG. 8A illustrates the frequency spectrum generated by corresponding Fast Fourier Transform (FFT) of the same rotational seismometer 10 for those angular displacements, which have been normalized such that $\Sigma\theta^2 = \Sigma\theta^2/Nv_s$, wherein N is the number of samples and $v_s$ is the sampling frequency. Similarly, FIGS. 7B and 7C illustrate the angular positions of the balance bob 14 for locations B and C, respectively, and FIGS. 8B and 8C illustrate the corresponding FFT for the same rotational seismometers 10 for the spectrum derived from those respective angular positions at those physical locations.

Figure 8B:
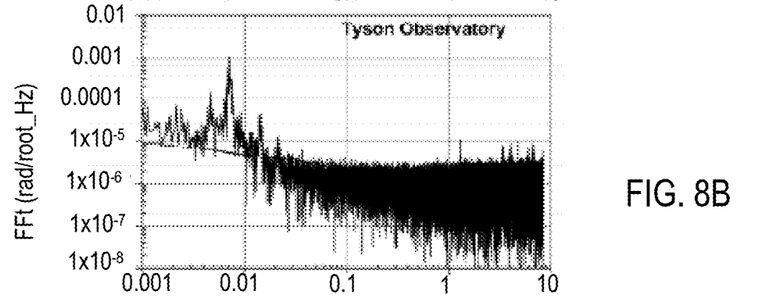
Figure 8C:
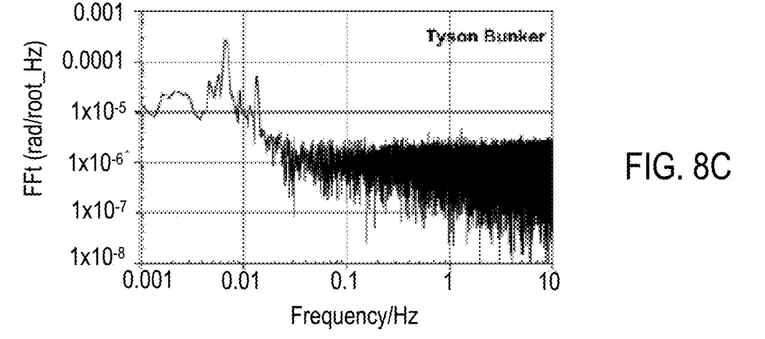
Figure 9:
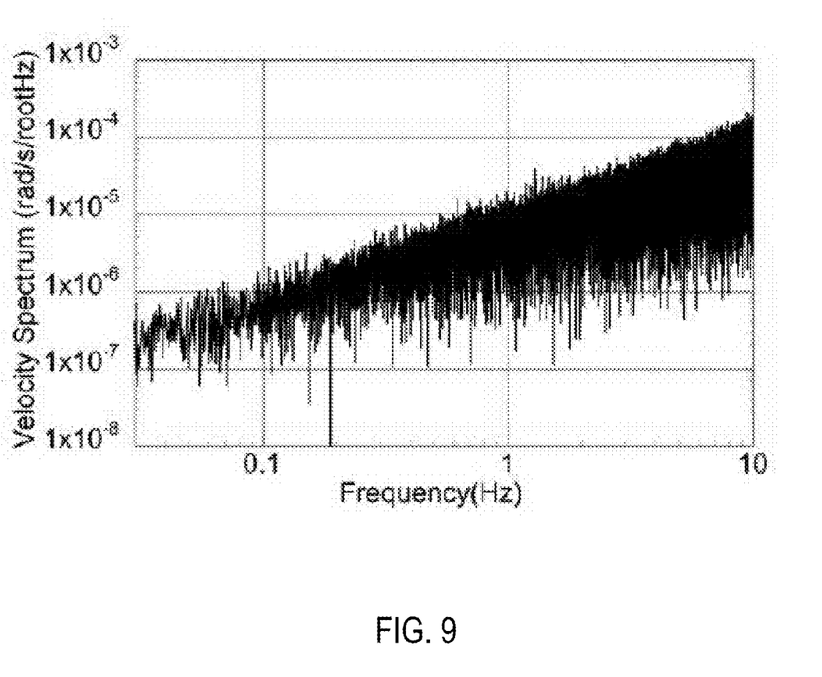
FIG. 9 is a graph illustrating velocity spectrum for one of the embodiments of the rotational seismometer.
Figure 10:
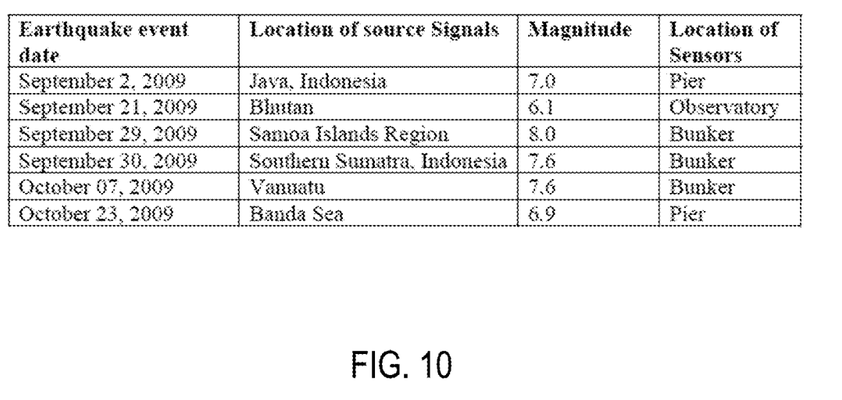
FIG. 10 is a table showing the earthquake events that occurred during operation of the three embodiments for the rotational seismometer.
Figure 11A:
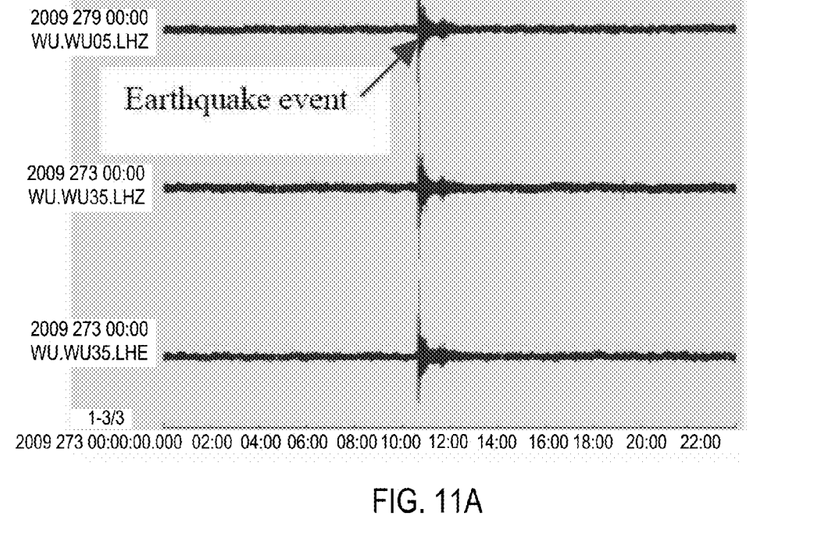
FIGS. 11A and 11B are graphs illustrating data recorded by a translational seismometer for two of the seismic events shown in table of FIG. 10.
Figure 11B:
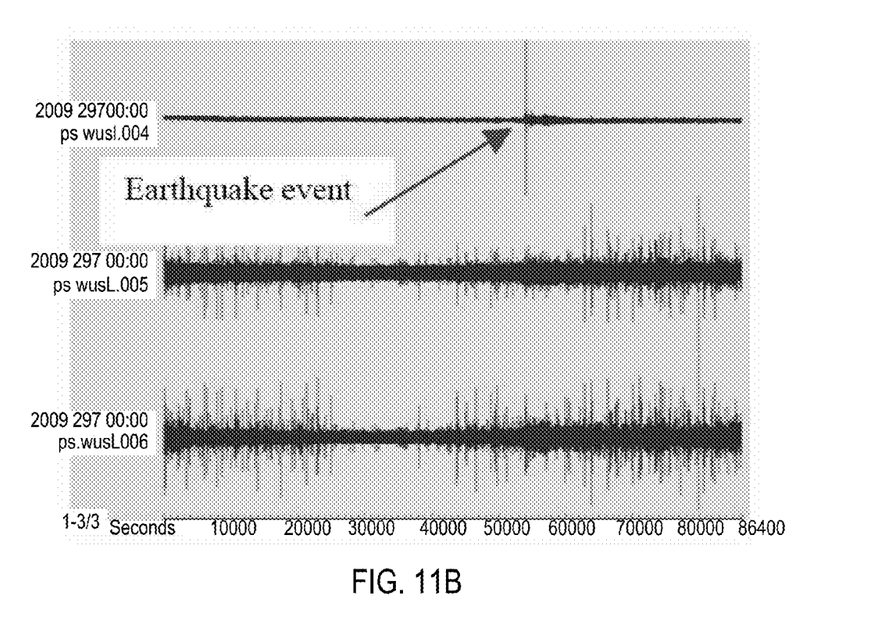
Figure 12:
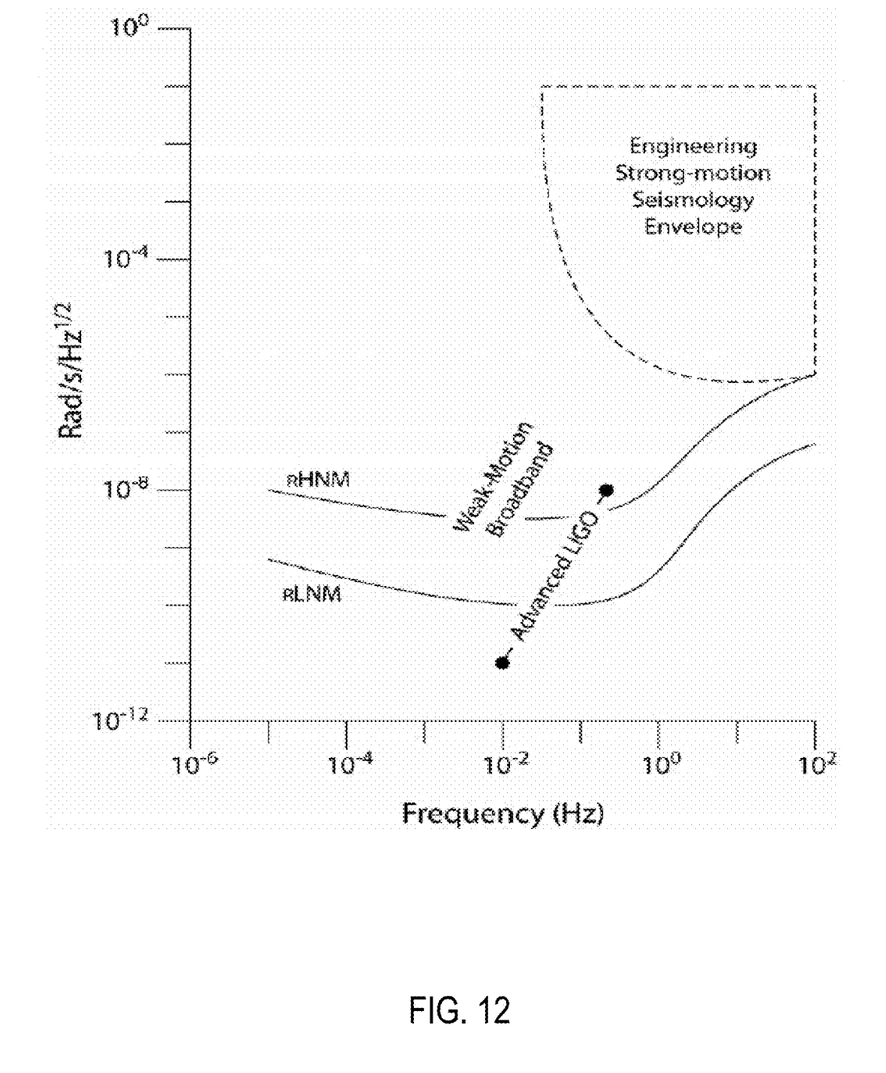
FIG. 12 is a chart illustrating a strong motion seismology envelope.

All of the data illustrated in FIGS. 7A-7C and 8A-8C were acquired for one hour starting at approximately at 2 AM, which on average was the quietest time at location A. As shown in FIGS. 8A, 8B and 8C for all three locations A, B and C, the FFT data shows a low frequency peak, which corresponds to the natural frequency of the balance bob 14. This natural frequency of the balance bob 14 ranges from 7 mHz to 9 mHz, which marks the lowest frequency limit detectable by the rotational seismometer 10 and is dependent on the length of the thin fiber 44 attached to the balance bob 14. As shown in the FFT data illustrated in FIGS. 8A-8C, the response of the rotational seismometer 10 is very flat when the frequency exceeds 30 mHz, which is the region of interest for torsional modes. The corresponding velocity spectrum for the data taken in location C is shown in FIG. 9. The response noise at location C is about $10^{-5}$ rad/s/√Hz at 30 mHz. Accordingly, the characteristics shown above make the rotational seismometer 10 at location C suitable for the detection and recording of near-field seismic rotations, thereby falling within the desirable envelope for strong-motion seismology illustrated in FIG. 12.

In the above arrangement, a conventional translational seismometer (not shown) was also set up near the rotational seismometer 10 at the three locations A, B and C to compare the performance of the translational seismometer 10 with the rotational seismometer 10. The horizontal components of the conventional translational broadband sensor for such a seismometer actually record a combination of translation and tilt motions, although tilt motions are generally ignored. The optimum setting for the rotational seismometer 10 is such that the seismometer 10 does not record these tilts and that the provision of a torsionally stiff wire 48 being attached to the top of the balance bob 14 makes this decoupling possible. Equally essential to viability of the rotational seismometer 10 is the seismometer's 10 insensitivity to rotations. Simple tests were done with the rotational seismometer 10 at location A on which these seismometers were physically banged on in the horizontal direction and only the translational seismometer responded. As shown in the table illustrated in FIG. 10 and the graphs shown in FIGS. 11A and 11B, a number of earthquake events occurred which were detected by the conventional translational sensor.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A rotational seismometer comprising:
a housing defining a chamber;
an optical lever disposed in the chamber, the optical lever including a light source for emitting a beam of light and a slit in communication with the light source for emitting the beam of light through the slit, the optical lever further comprising a position sensing diode for detecting an image generated by the beam of light after reflection;
a field lens having a lens for focusing the beam of light generated by the light source; and
a balance bob suspended from a ceiling of the housing inside the chamber, the balance bob including a plate having a mirror with a thin fiber attached to the plate and a stiff wire secured to the thin fiber for suspending the balance bob, the mirror reflecting the beam of light to generate a reflected beam of light back through the lens for detecting of the image generated by the reflected beam of light by the position sensing diode, wherein the balance bob being suspended by the thin fiber and the stiff wire permits detection of rotational motions related to a seismic activity while preventing detection of torsion motions related to the seismic activity.

2. The rotational seismometer of claim 1, wherein the optical lever, the field lens and the balance bob provide a sensitivity ranging from $2 \times 10^{-7}$ rad/s/$\sqrt{Hz}$ to $1 \times 10^{-4}$ rad/s/$\sqrt{Hz}$ in a frequency range of 30 mHz to 10 Hz.

3. The rotational seismometer of claim 1, wherein the balance bob further includes a rectangular cross-section that connects the thin fiber to the plate for suspending the balance bob.

4. The rotational seismometer of claim 3, wherein the rectangular cross-section is made from an Stainless Steel 304—Lenntech 1998.

5. The rotational seismometer of claim 1, wherein the stiff wire bends when a tilt motion is applied to the housing of the rotational seismometer.

6. The rotational seismometer of claim 1, wherein the thin fiber does not bend when a tilt motion is applied to the housing of the rotational seismometer.

7. The rotational seismometer of claim 3, wherein the rectangular cross-section that suspends the balance bob reduces a restoring torque in an event of a seismic event that is detected by the rotational seismometer.

8. The rotational seismometer of claim 1, wherein the light source is a light emitting diode.

9. The rotational seismometer of claim 1, wherein the position sensing diode provides data related to the position of the reflected beam of light.

10. A system for detecting rotational motions related to seismic activity comprising:
a housing defining a chamber;
an optical lever disposed in the chamber, the optical lever including a light source for emitting a beam of light and a slit in communication with the light source for emitting the beam of light through the slit, the optical lever further comprising a position sensing diode for detecting an image generated by the beam of light after reflection;
a field lens having a lens for focusing the beam of light generated by the light source;
a balance bob suspended from a ceiling of the housing inside the chamber, the balance bob including a plate having a mirror with a thin fiber attached to the plate and a stiff wire attached to the thin fiber for suspending the balance bob, the mirror being adapted to reflect the beam of light to generate a reflected beam light back through the lens for detection of the image generated by the reflected beam of light by the position sensing diode, wherein the position sensing diode generates data related to the position of the image, wherein the balance bob being suspended by the thin fiber and the stiff wire permits detection of rotational motions related to a seismic activity while preventing detection of torsion motions related to the seismic activity;
a processor for processing data received from the position sensing diode of the optical lever; and
an output device for displaying the data processed by the processor.

11. The system of claim 10, further comprising a database for storing the data processed by the processor.

12. The system of claim 10, wherein the output device is a seismograph.

13. The system of claim 10, wherein the thin fiber does not bend and the stiff wire does bend when a tilt motion is applied to the housing.

14. The system of claim 10, wherein the data received from the position sensing diode related to the position of the image is processed to detect rotational motions associated with seismic activity.

15. A method for detecting rotational motions comprising:
providing a rotational seismometer comprising:
a housing defining a chamber;
an optical lever disposed in the chamber, the optical lever including a light source for emitting a beam of light and a slit in communication with the light source for emitting the beam of light through the slit, the optical lever further comprising a position sensing diode for detecting an image generated by the beam of light after reflection;
a field lens having a lens for focusing the beam of light generated by the light source; and
a balance bob suspended from a ceiling of the housing inside the chamber, the balance bob including a plate having a mirror with a thin fiber attached to the plate and a stiff wire attached to the thin fiber for suspending the balance bob, the mirror being adapted to reflect the beam of light to generate a reflected beam of light back through the lens for detection of the image by the position sensing diode, wherein the stiff wire bends and the thin fiber does not bend when a tilt motion is applied to the housing;
detecting rotational motions related to seismic activity by the rotational seismometer; and
recording the rotational motions detected by the rotational seismometer.

16. The method of claim 15, wherein a seismograph records the rotational motions detected by the rotational seismometer.

17. The method of claim 15, wherein the position sensing diode detects the rotational motions related to seismic activity based on the position of the image generated off the reflected beam of light reflected by the balance bob and focused by the field lens.

18. The method of claim 15, wherein stiff wire being secured to the thin wire permits detection of rotational motions while preventing detection of torsion motions by the rotational seismometer.

19. The method of claim 15, wherein an angular displacement of the image due to motions in the mirror are independent of any changes in ambient temperature outside of the housing.

20. The method of claim 15, wherein suspending the balance bob with the thin fiber makes the balance bob insensitive to ground tilts.

* * * * *